United States Patent
Künz et al.

(10) Patent No.: US 11,953,382 B2
(45) Date of Patent: Apr. 9, 2024

(54) CALIBRATION TOOL FOR PLANAR CHIP APPLICATIONS

(71) Applicant: STRATEC SE, Birkenfeld (DE)

(72) Inventors: Manuel Künz, Keltern (DE); Daniel Ahr, Neuenbürg (DE); Martin Trump, Pforzheim (DE); Rüdiger Retzlaff, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 853 days.

(21) Appl. No.: 16/988,656

(22) Filed: Aug. 9, 2020

(65) Prior Publication Data
US 2021/0041306 A1 Feb. 11, 2021

(30) Foreign Application Priority Data
Aug. 9, 2019 (GB) .................................. 1911386

(51) Int. Cl.
*G01K 1/02* (2021.01)
*B01L 7/00* (2006.01)
(Continued)

(52) U.S. Cl.
CPC ................ *G01K 1/026* (2013.01); *B01L 7/52* (2013.01); *B01L 9/527* (2013.01);
(Continued)

(58) Field of Classification Search
CPC . G01K 1/026; B01L 7/52; B01L 9/527; B01L 2200/025; B01L 2200/028;
(Continued)

(56) References Cited

U.S. PATENT DOCUMENTS

| 5,601,141 A | 2/1997 | Gordon et al. |
| 2003/0008286 A1* | 1/2003 | Zou ..................... B01J 19/0093 435/6.12 |

(Continued)

FOREIGN PATENT DOCUMENTS

| CN | 101429560 A | 5/2009 |
| CN | 103385699 A | 11/2013 |

(Continued)

OTHER PUBLICATIONS

Translation of DE102015114043A1, Stiel Cornelia, Mar. 2, 2017 (Year: 2017).*

*Primary Examiner* — Samuel P Siefke
*Assistant Examiner* — Henry H Nguyen
(74) *Attorney, Agent, or Firm* — 24IP Law Group USA, PLLC; Timothy R DeWitt

(57) ABSTRACT

A system comprising a device or the device itself for measuring temperatures, comprising a sensor array plate, comprising on a first surface at least one temperature sensor arranged on at least one tongue that is surrounded by a cut-out leaving a bridge to the sensor array plate, wherein the at least one sensor has on both sides' spacer and a second surface opposite the first surface for connection to at least one operating plate of a thermocycler; and a pressure plate, comprising fins at the side for connection to the sensor array plate that align with the spacer of the sensor array plate when a pressure plate is arranged onto a sensor array plate.

14 Claims, 6 Drawing Sheets

(51) Int. Cl.
  *B01L 9/00* (2006.01)
  *G01N 35/00* (2006.01)
(52) U.S. Cl.
  CPC ... *B01L 2200/025* (2013.01); *B01L 2200/028* (2013.01); *B01L 2200/147* (2013.01); *B01L 2200/148* (2013.01); *G01N 2035/00366* (2013.01)
(58) Field of Classification Search
  CPC ......... B01L 2200/147; B01L 2200/148; B01L 3/5027; B01L 2300/0816; G01N 2035/00366
  See application file for complete search history.

(56) References Cited

U.S. PATENT DOCUMENTS

| | | | |
|---|---|---|---|
| 2004/0033619 A1 | 2/2004 | Weinfield et al. | |
| 2009/0285261 A1* | 11/2009 | Casey | G01K 7/015 |
| | | | 374/E7.018 |
| 2011/0312645 A1 | 12/2011 | Silverbrook et al. | |
| 2016/0361719 A1* | 12/2016 | Courtney | B01L 3/50851 |

FOREIGN PATENT DOCUMENTS

| | | | | |
|---|---|---|---|---|
| CN | 105505761 A | 4/2016 | | |
| DE | 102015114043 A1 * | 3/2017 | ................ | B01J 4/02 |

* cited by examiner

FIG. 5
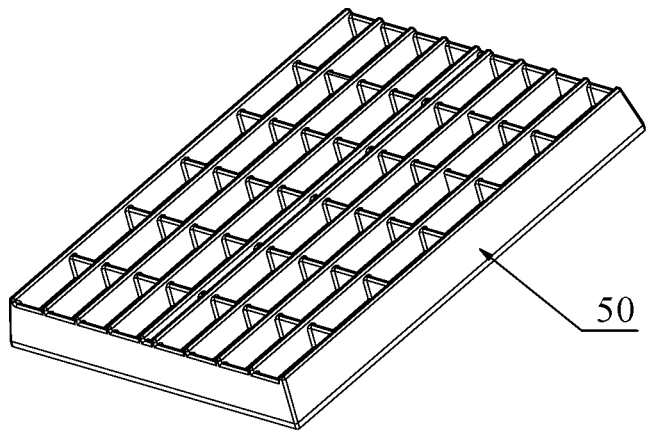
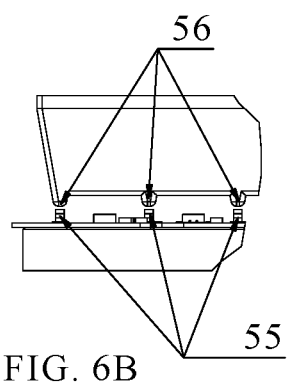
FIG. 6B
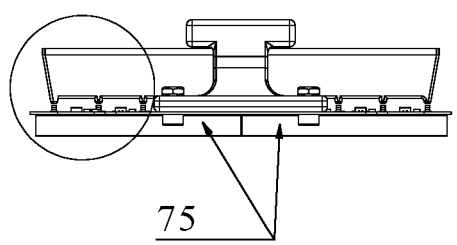
FIG. 6A
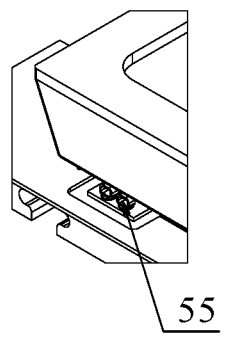
FIG. 6C

CALIBRATION TOOL FOR PLANAR CHIP APPLICATIONS

CROSS-REFERENCE TO RELATED APPLICATIONS

The present application claims priority to British Patent Application No. GB 1911386.9 filed on Aug. 9, 2019. The aforementioned application is hereby incorporated by reference in its entirety.

BACKGROUND OF THE INVENTION

Field of the Invention

The present invention relates to a system comprising a device or the device itself for measuring temperatures, e.g. in a thermocycler.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

Polymerase chain reaction (PCR) thermal cycling is a method for amplification of specific DNA target sequences. The reaction solutions comprise a reaction buffer, enzymes, primer and nucleotides. This mixture has to undergo repeated changes of temperature to enable amplification of the desired DNA sequence. The repeated change of temperature is referred to as thermal cycling and may be achieved by electrical heating and fluidic based cooling or the use of Peltier elements. A quantitative analysis during PCR cycling may be achieved by measurement of fluorescence emission.

PCR thermal cyclers are widely used as laboratory stand-alone devices to amplify segments of DNA via the polymerase chain reaction. They usually have one thermal block with holes where single tubes, stripes of tubes, or micro plates holding reaction mixtures can be inserted.

A thermocycler for flat consumables comprises flat heating plates, so called "operating plates" to apply temperature to the consumable. Homogeneity of the temperature of these operating plates is essential for the thermocycling process. Therefore, several temperature sensors are placed within such operating plates to control the operating plate temperature and to monitor the temperature distribution. The sensor-operating plate combination has to be calibrated, because the thermal contact of these sensors to the operating plate and the tolerance of the sensors itself varies due to mechanical and component tolerances.

A technical solution known from the prior art requires a complete measurement system with sensors and electronics that are not separable as calibration data are stored directly on the control electronics. In case of an expired calibration, a defect electronic part or even a broken cable would require the whole tool to be send to the manufacturer for reparation or calibration. Additionally, such systems are not optimized for flat operating plates. Usually, they are used for microtiter or single tube based thermal cyclers.

Published U.S. Pat. No. 5,601,141 describes a batch thermal cycler for large numbers of biological or chemical samples which uses n modules each in good thermal contact with the samples, but substantially isolated from one another, thermally and functionally. Each module carries samples on an upper sample plate. The module has a temperature sensor adjacent the samples, an electrical resistance heating element, and a circulating fluid heat exchanger for step cooling. Heating occurs at a point generally between the samples and the source of the cooling. The modules are individually replaceable. O-rings automatically seal fluid and electrical interfaces. An electrical controller has n simultaneous channels that provide closed loop control of the electrical power to each module. As a method, the invention includes at least one modular temperature zone where the temperature is sensed at a point adjacent the samples in that zone. The samples are heated adjacent the sample plate. Cooling is by a step change. The cooling overshoots a set lower temperature. A small, well-controlled heating corrects the overshoot.

Published U.S. Patent Application No. 2004/033619 A1 discloses a heater module that includes a heat distribution plate including a bottom portion having first and second sides and a plurality of projections extending away from one of the sides. A heat source is provided for heating the heat distribution plate, and, optionally, a heating tray can be used to receive the heat source and heat distribution plate. The heater module is adapted to engage a sample purification tray having a plurality of purification and/or discharge columns which can extend through openings in the heater module and direct a sample into a sample receiving tray.

Published Chinese Patent Application No. 105505761 A describes a digital isothermal nucleic acid detecting device which comprises a micro-fluidic chip, a temperature control system and a pressure driving system. A microfluidic channel for microsphere forming and a reaction section for nucleic acid amplification are formed by the micro-fluidic chip through sequential laminating of a substrate layer, a channel layer arranged on the substrate layer and a cover plate layer arranged on the channel layer. The temperature control system comprises a lower press plate for applying pressure to the substrate from bottom to top and an upper press plate for applying pressure to the cover plate layer from top to bottom, and temperature sensing chips and temperature control heating elements for heating the reaction section are arranged in the upper press plate and the lower press plate. The pressure driving system is connected to the micro-fluidic chip and used for applying pressure to the channel layer in the micro-fluidic chip so that liquid to be detected can flow into the reaction section from the inflow end. According to the scheme, microsphere preparation and nucleic acid amplification and detection are integrated through the digital isothermal nucleic acid detecting device and the detection method, and the advantages of being high in sensitivity and the like are achieved.

Published Chinese Patent Application No. CN 101429560 A relates to a quantitative measuring device for polymerase chain reaction, wherein a heating unit used for supplying the temperature required by the PCR reaction, a microfluid unit used for loading and distributing biological sample solution and making the biological sample solution and DAN of a biological sample generate PCR reaction, and a measuring unit used for acquiring electrical signals of the DNA amplified yield are integrated into three modules, and the three modules are connected with each other by adopting an overlaid structure and aligned to each other. The preparation process of the preparation method is to utilize the micro-nano processing technology to integrate the three units into three different chips, to package the chips and arrange the chips in different packaged sockets, and to finally connect the packaged sockets by adopting a flip-shell structure by means of overlapping. The quantitative measuring device for the polymerase chain reaction reduces the difficulty of the prior processing method and the equipment cost; only need one of the modules needs to be replaced when the device is used each time; and the adopted overall structure is quite suitable to be carrier.

Published Chinese Patent Application No. CN 103385699 A provides a flexible resistance-type MEMS (micro-electro-mechanical systems) temperature sensor array and a preparation method thereof. The sensor array comprises a fixed substrate, a flexible substrate film, a temperature sensitive film, sensor electrodes, a flexible covering layer and electrical conductors. A preparation method for the sensor array comprises the following steps of forming a metal sacrificial layer on the upper surface of a fixed substrate material in a sputtering or thermal evaporation manner, performing spin coating on the sacrificial layer with PI (polyimide), preparing the temperature sensitive film, preparing sensor electrode arrays, preparing the covering layer PI film, imaging the covering layer PI film, peeling off flexible sensors and welding the electrical conductors. The sensor array provided by the invention has biocompatibility, stronger mechanical property, high-temperature resistance, high temperature impact resistance and higher ultrasonic propagation speed. Sizes and shapes of the sensitive film and sensor electrode points can be controlled by exposure, and the temperature field distribution of a skin surface can be measured in real time. The preparation method for the sensor array is simple and reliable and low in cost, and can be realized by adopting a micromachining process.

Published U.S. Patent Application No. 2011/312645 A1 relates to a microfluidic device for detecting target nucleic acid sequences in a sample, the microfluidic device having a supporting substrate, a microsystems technology (MST) layer overlying the supporting substrate for processing the sample, the MST layer having an array of hybridization chambers, each containing electrochemiluminescent (ECL) probes for hybridization with the target nucleic acid sequences, and electrode pairs for receiving an electrical pulse, the ECL probes being configured to emit a photon of light when hybridized with one of the nucleic acid targets and activated by one of the electrodes, an array of temperature sensors positioned such that at least one of the temperature sensors corresponds to each of the hybridization chambers respectively, and, heaters for heating each of the hybridization chambers, such that, output from the temperature sensors is used for feedback control of the heaters.

A disadvantage of available solutions is therefore that sensors and electronics are not separable. Thus, the whole measurement tool has to be replaced in case of a required recalibration or a defect.

The storage of calibration data in the control electronics is also a disadvantage of known solutions, because only one sensor array can be used with the corresponding control electronic.

Further disadvantages from known solutions refer to a high manual mounting effort for the sensor housing and a huge thermal mass. The minimal heights of the tool may be limited due to a complex sensor-housing design.

Devices with printed circuit boards may be related to higher efforts regarding thermal insulation, in particular, when the sensor is part of the housing and there is a gap present between printed circuit board and operating plate. This will result in a different thermal behavior of the operating plate compared to normal operations where a flat microfluidic consumable allows heat dissipation over the whole surface of the operating plate.

Sensor arrays known in the prior art do not allow the use of the instrument's pressure plates to fix and press the sensors to the operating plate for achieving a more reliable measurement. Available sensor arrays require certain space above the operating plate for handling and proper adjustment.

SUMMARY OF THE INVENTION

It is therefore the object of this invention to provide a measurement tool for ensuring a reliable and accurate measurement of accuracy and homogeneity of a flat thermocycler operating plates.

The present disclosure provides a device for measuring temperatures, comprising
 a sensor array plate, comprising on a first surface at least one temperature sensor arranged on at least one tongue that is surrounded by a cut-out leaving a bridge to the sensor array plate, wherein the at least one temperature sensor has on both sides' spacer and a second surface opposite the first surface for contacting at least one operating plate of a member of an automated analyser system; and
 a pressure plate, comprising fins at the side for connection to the sensor array plate that align with the spacer of the sensor array plate when a pressure plate is arranged onto a sensor array plate.

The device may comprise in an embodiment up to 16 temperature sensors.

In a further aspect, the temperature sensors may be analogue or digital.

The sensor array plate of a device according to the invention may further comprise a non-volatile data memory.

In another embodiment, the device according to the invention may comprise an analogue-digital converter when analogue sensors are arranged onto the sensor array plate.

It is further intended that the components arranged onto the sensor array plate can be surface mounted devices and the second surface is planar.

In a further aspect of the invention, between the at least one temperature sensor and the sensor array plate a first thermal pad can be arranged that is connected to thermal bridges reaching a second thermal pad on the second surface of the sensor array plate.

In a further embodiment of the invention, the second thermal pad may be covered by a heat transfer foil.

It is further envisaged that the sensor array plate may comprise alignment features for alignment with the at least one operating plate of the member of an automated analyser system.

The sensor array plate may further comprise a handle for moving it.

In another embodiment of the invention, the sensor array plate may comprise a flat cable socket.

Another object of the invention refers to a system for measuring temperatures of an operating plate of an automated analyser system comprising a device as described above and control electronics arranged apart from a heated operating plate of a member of an automated analyser system.

In a further aspect of the invention, the system or the device as described above and the control electronics may be connected by a flexible flat cable.

It is further envisaged that the member of an automated analyser system or the automated analyser system itself can be a thermocycler.

The use of a device as described above, or a system as described above for measuring temperatures in a thermocycler is another object of the present invention.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIG. 5 shows the bottom side of a pressure plate.

FIGS. 6A-6C show the interaction between pressure plate and sensor array plate.

DETAILED DESCRIPTION OF THE INVENTION

The technical problem is solved by the independent claims. The dependent claims cover further specific embodiments of the invention.

A tool according to the present invention shall be separated in two parts, a sensor array and control electronics in order to o keep all electronics away from the heat source except for the sensors and signal conversation. Other major requirements for a measurement tool according to the invention refer to a precise temperature measurement, height compensation to ensure a good thermal contact to the thermocycler operating plate, a small thermal mass and a fast response to temperature changes. Temperature sensors shall be calibratable and the calibration values shall be stored in every sensor array separately. This allows to exchange a sensor board without the need of a new calibration because the calibration values are stored in a memory in the sensor board. Thus, it will be possible to use the tool with a spare sensor array while the sensors used before will require a new calibration. The down time of a device according to the invention in case of faulty sensor or other electronics will also be reduced due to the lack of performing a new calibration when a substitute or second sensor is present or available. The measurement tool of the present invention shall further have an interface for the thermocycler instrument to allow calibration during use of other parts of the thermocycler The present invention is based on the use of a measurement tool with an optimized design, to ensure similar thermal conditions while measuring, compared to normal operation and to split the sensor plate from the control electronics allowing an easy sensor replacement in case of a defect or a necessary recalibration. Additionally, each sensor of the measurement tool can be pressed individually towards or onto the operation plate to ensure an optimal thermal contact between them.

The measurement tool according to the present invention comprises two parts. The first part is a sensor array plate and the second part comprise a separate and outside of the heated area placed control electronic. A flexible flat cable (FFC) connects both parts.

Figure 1:
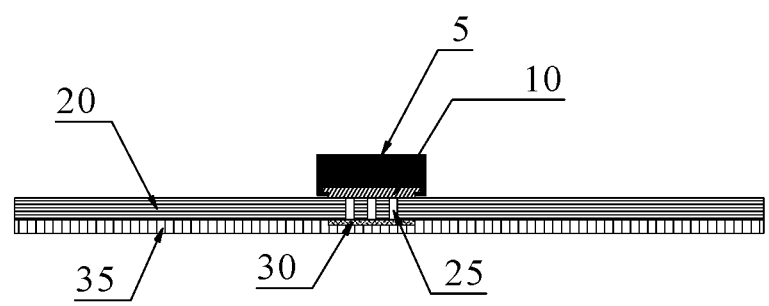
FIG. 1 shows schematically a sectional view of a sensor array plate.

The device of the present invention is intended to be part of a member of an automated analyzer system, wherein member means a device, sub-device or modular part that is attached or part of a multi-component analyzer system The design of the measurement tool allows to use standard instrument interfaces like alignment features for microfluidic consumables and consumables comprising a pressure plate mechanism. Therefore, the measurement tool of the present invention is suitable to use the same frame as the consumable and comprises features to allow the instrument's pressure plate mechanism to press each single sensor individually towards the operating plate. The sensor array plate contains at least one analog or digital sensor element 5, e.g. a temperature sensor, a nonvolatile memory and in cases of analog sensors an A/D converter. All components are surface mounted devices (SMD) so that the bottom side is completely planar, like microfluidic consumables. The point of measurement is located on a sensor housing bottom first thermal pad 10 (FIG. 1). At least one thermal bridge 25 connects the sensor area with a not solder mask coated second thermal pad 30 on the bottom or opposite side of the circuit board 20 for a good heat transfer. An additional heat transfer foil 35 is used to even surface roughness, optimizes thermal conductivity and insulates electrically (FIG. 1).

Figure 2:
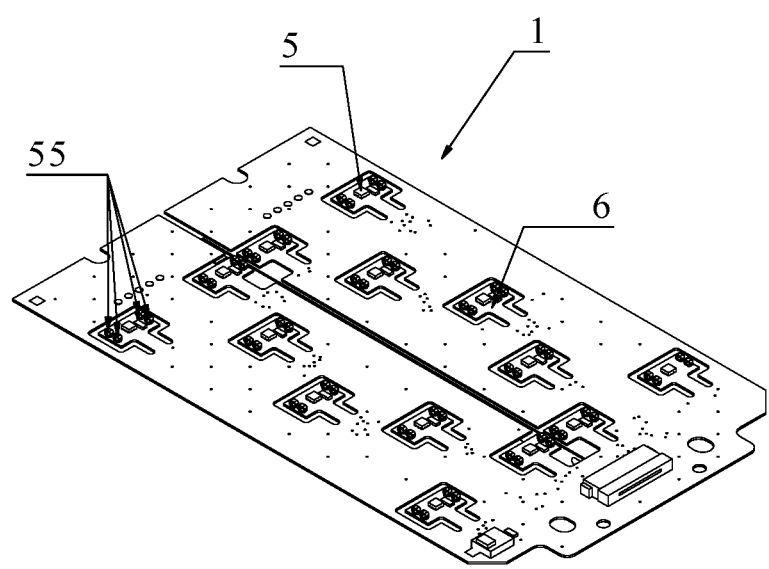
FIG. 2 shows a perspective view on a sensor array plate.

The areas of the sensor array plate 1, where sensors elements 5 are placed are surrounded by a cut out in a way that only a small bridge remains to connect a sensor comprising tongue 6 to the reaming part of the circuit board (FIG. 2). The cut-out represents a kind of a thermal insulation of the area comprising the sensor. The use of a thin material for manufacturing the circuit board of approx. 0.4 mm ensures that each measuring point has a minimized thermal mass. The small bridge also allows a slight individually vertical movement of every sensor tongue.

The pressure plate comprises fins to ensure good thermal contact between microfluidic consumables and the operating plate without increasing the thermal mass by the pressure plate.

It is to be noted that each sensor and not the circuit board has to be in thermal contact with the operating plate. Therefore, spacers 55 (FIG. 2) are installed on the surface of the sensor array plate 1 to align with the fins 56 (FIGS. 6A-6C) of the pressure plate. These spacers ensure transfer of the pressure plate force only to tongues comprising a sensor. FIGS. 6B and 6C are magnifications in different views of the part in the circle on FIG. 6A with the two individual thermocycler operating plates 75.

Figure 3:
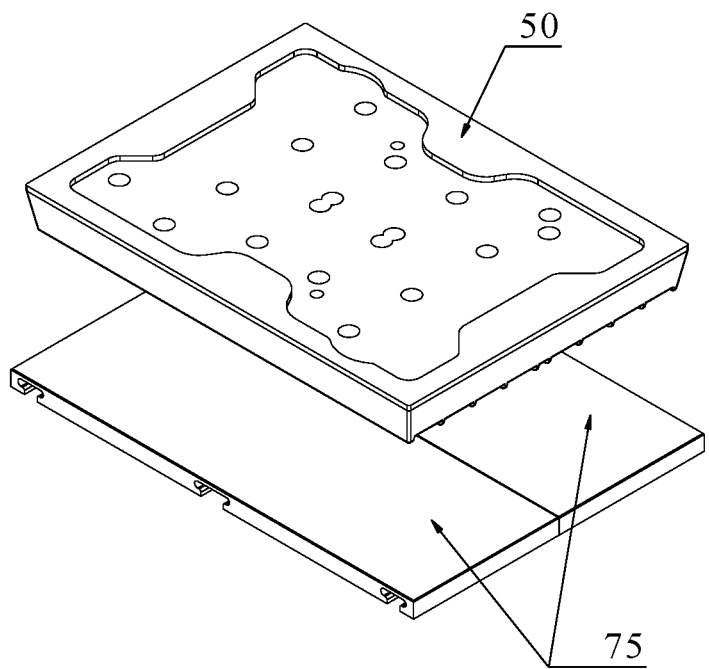
FIG. 3 shows a pressure plate above a sensor array plate.
Figure 4:
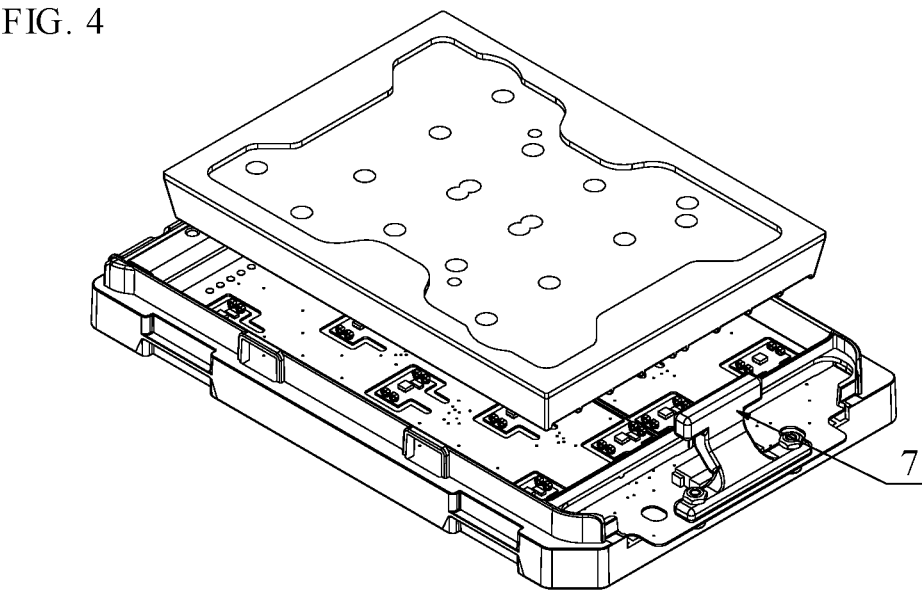
FIG. 4 shows the arrangement of pressure plate, sensor array plate and operating plate.

FIG. 3 shows a pressure plate 50 that is arranged next to two individual thermocycler operating plates 75 and in FIG. 4 is a handle 7 shown that is optional for easier handling of the measurement plate.

FIG. 5 shows a pressure plate 50 in a view on its underside.

Figure 7:
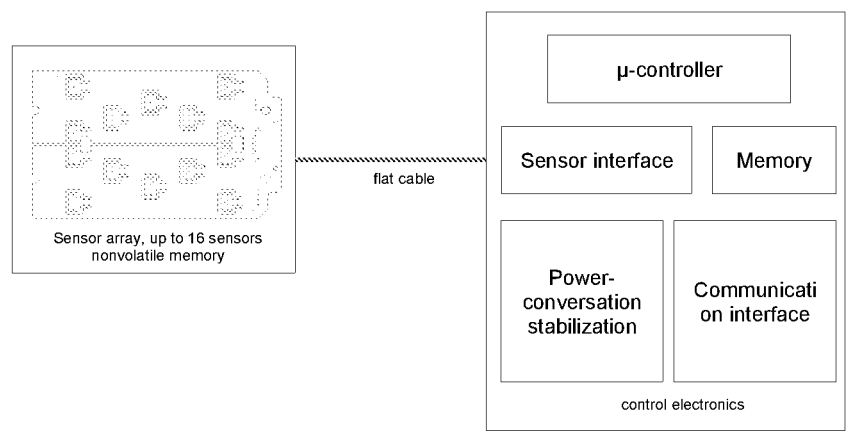
FIG. 7 shows the connection and arrangement of the two parts comprising sensor array plate (left side) and control electronics (right side).

FIG. 7 shows the arrangement of both parts, a sensor array that is connected by a flat cable with the control electronics. The evaluation electronics is placed in a separated housing with μ-controller, power conversation and stabilization, memory, sensor array interface, USB interface and CAN interface.

The control electronic processes the sensor information with the stored calibration data and provides temperature values to the instrument or an external PC via CAN bus, USB or any other suitable interfaces. Power is supplied over a respective interface connector.

Figure 8:
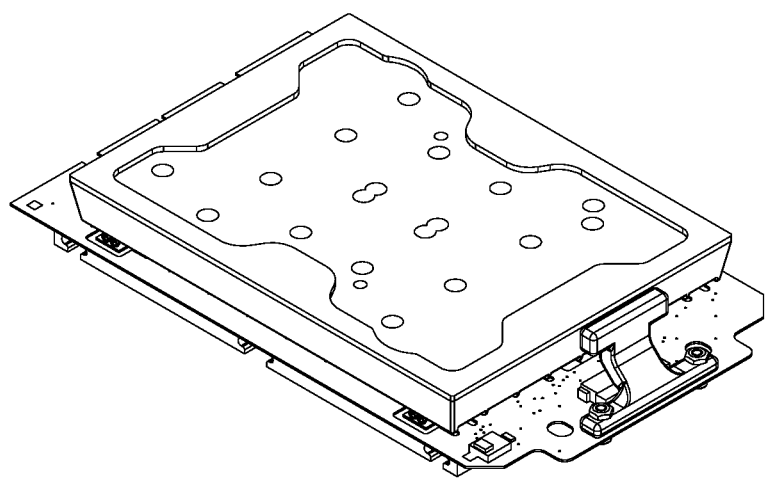
FIG. 8 shows an isometric view on operating plate, sensor array plate and pressure plate.

FIG. 8 shows the pressure plate that is attached to the sensor array plate. And the operating plates.

The advantages of the invention can be summarized as follows:

A separable design allows disjointed transport and storage.

It is possible to change functional components without the need of a new calibration of the whole system.

Calibration data is stored on the sensor array PCB.

It is possible to use different sensor array plates, e.g. with different geometries with one evaluation electronics.

It is possible to change a sensor array plate with an expired calibration with a recently calibrated one without any downtime of the tool.

There is no difference regarding thermal behavior between sensor PCB and operating plate resulting in a similar behavior compared to normal operation.

The use of a pressure plate generates a uniform pressure, no additional weight is necessary.

Using the alignment features, it is simple to place the tool onto the operating plate.

The measurement tool can measure the homogeneity and absolute temperature of the operating plate.

By connecting the tool to the instrument interface, it will be possible to calibrate the operating plate temperature sensors in the field.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 sensor array plate
5 sensor element
6 sensor tongue
7 handle
10 first thermal pad
20 circuit board
25 thermal bridge
30 second thermal pad
35 heat transfer foil
50 pressure plate
55 spacer
56 fin
75 operating plate

What is claimed is:

1. A device for measuring temperatures, comprising:
a sensor array plate, comprising on a first surface at least one temperature sensor arranged on at least one tongue that is surrounded by a cut-out leaving a bridge to the sensor array plate, wherein separate spacers are arranged on the first surface of the sensor array plate on both sides of the at least one temperature sensor, and a second surface opposite the first surface for contacting at least one operating plate of a member of an automated analyser system, wherein a first thermal pad is arranged between the at least one temperature sensor and the sensor array plate and the first thermal pad is connected by thermal bridges to a second thermal pad on the second surface of the sensor array plate; and
a pressure plate, comprising fins at a side for connection to the sensor array plate that align with the spacers of the sensor array plate when the pressure plate is arranged onto the sensor array plate.

2. The device of claim 1, comprising up to 16 temperature sensors.

3. The device of claim 1, wherein the temperature sensors are analogue or digital.

4. The device of claim 1, wherein the sensor array plate comprises a non-volatile data memory.

5. The device of claim 1, comprising an analogue-digital converter when the at least one temperature sensor is an analogue sensor arranged onto the sensor array plate.

6. The device of claim 1, wherein components arranged onto the sensor array plate are surface mounted devices and the second surface is planar.

7. The device of claim 1, wherein the second thermal pad is covered by a heat transfer foil.

8. The device of claim 1, wherein the sensor array plate comprises alignment features for alignment with the at least one operating plate of the member of the automated analyser system.

9. The device of claim 1, wherein the sensor array plate further comprises a handle for moving the sensor array plate.

10. The device of claim 1, wherein the sensor array plate comprises a flat cable socket.

11. A system for measuring temperatures of an operating plate of the automated analyser system comprising a device according to claim 1 and control electronics arranged apart from a heated operating plate of the member of an automated analyser system.

12. The system of claim 11, wherein the device of claim 1 and the control electronics are connected by a flexible flat cable.

13. The system of 11, wherein the member of the automated analyser system or the automated analyser system is a thermocycler.

14. A method for measuring temperatures in a thermocycler comprising the steps of:
arranging microfluidic consumables on at least one operating plate of a thermocycler;
measuring temperatures in the thermocycler with a sensor array plate, comprising on a first surface at least one temperature sensor arranged on at least one tongue that is surrounded by a cut-out leaving a bridge to the sensor array plate, wherein separate spacers are arranged on the first surface of the sensor array plate on both sides of the at least one temperature sensor, and a second surface opposite the first surface for contacting the at least one operating plate of a member of the thermocycler, wherein a first thermal pad is arranged between the at least one temperature sensor and the sensor array plate, and the first thermal pad is connected by thermal bridges to a second thermal pad on the second surface of the sensor array plate; and a pressure plate, comprising fins at a side for connection to the sensor array plate that align with the spacers of the sensor array plate when the pressure plate is arranged onto the sensor array plate.

* * * * *